United States Patent Office 3,123,146
Patented Mar. 3, 1964

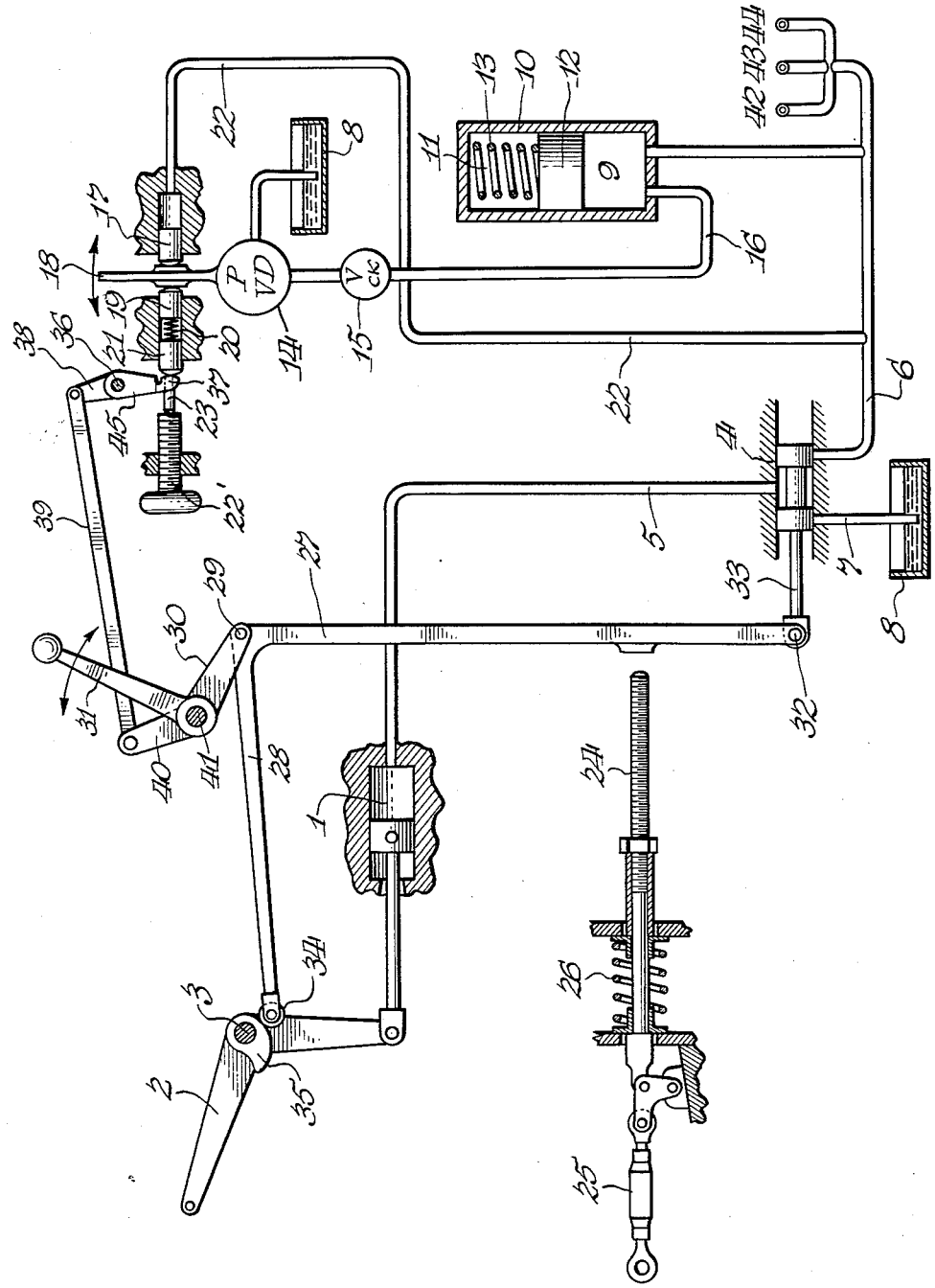

3,123,146
HYDRAULIC CONTROL SYSTEMS
Robert Marindin, Doncaster, England, assignor to International Harvester Company, Chicago, Ill., a corporation of New Jersey
Filed Mar. 22, 1961, Ser. No. 97,592
Claims priority, application Great Britain Apr. 1, 1960
12 Claims. (Cl. 172—8)

This invention relates to hydraulic control systems, and is particularly concerned with an improved hydraulic control system which, while of general application for the operation of hydraulic power transmitting devices, is of especial utility for use in connection with tractors provided with one or more hydraulic power transmitting devices, for example, a power lift for an implement operating with automatic draft control and/or position control, earth-working or material-handling equipment, auxiliary means for operating tractor-mounted implements, power steering apparatus, or any combination thereof.

The rate of consumption of hydraulic fluid under pressure and the requisite degree of pressure available at a supply source for operating the power transmitting device or devices may vary very considerably according to the type and number of the power transmitting devices to be operated from the pressure source. For instance, in the case of a tractor provided with a power lift for an implement mounted on a three-point linkage, and operating with draft control and/or position control, the consumption of pressure fluid in normal operation takes place in relatively small increments and the degree of pressure available need only be sufficient to lift the implement with adequate rapidity to give sensitive response to the automatic draft or other control means. Under these conditions, a pump having a relatively low rate of output may be capable of supplying fluid under pressure for the operation of the power lift. On the other hand, if the tractor is provided with one or more hydraulic power transmitting devices in addition to the power lift, e.g. for the operation of power steering and/or other auxiliaries, or with one or more power transmitting devices for the operation of earth-working or material-handling equipment, the consumption of fluid under pressure and the operating pressure required may be very high, at least for intermittent periods, and this necessitates the use of a pump having a correspondingly high rate of output.

The use of a high output pump for the operation of a power lift in conjunction with automatic draft control is undesirable, as it is liable to occasion harshness of operation and possible over-correction. On the other hand, the use of a low output pump would not provide adequate supply of fluid under requisite pressure for the operation of one or more power transmitting devices requiring a relatively high operating pressure and large consumption of fluid under pressure.

It is well known to use a hydraulic accumulator to accommodate fluctuations in demand for hydraulic fluid under pressure and to ensure that a supply of hydraulic fluid at requisite pressure is instantaneously available when required for the operation of a hydraulic power transmitting device. It is also known to maintain a predetermined pressure in the accumulator by controlling a pump supplying fluid under pressure to the accumulator in such a manner that the pump is automatically put into or out of effective operation in response to variations in pressure in the accumulator.

The present invention is specifically concerned with improvements in a hydraulic control system of the kind wherein hydraulic fluid under pressure for the instantaneous operation of a hydraulic power transmitting device or devices is obtained from a hydraulic accumulator to which fluid is fed under pressure by a continuously driven pump controlled by means responsive to variation in pressure in the accumulator so that the pump is put into effective operation when required to make up loss of pressure fluid from the accumulator.

As explained above, the most desirable operating pressure for power transmitting devices for different purposes may vary considerably. For example, in the operation of a power lift for an implement with automatic draft control, the operating pressure level is preferably selected so as to give sensitive response without harsh operation or over-correction, and consumption of pressure fluid is in small increments, whereas, for raising the implement rapidly to an elevated transport position, a higher degree of consumption and temporarily increased level of pressure may be desirable. Furthermore, for the operation of power transmitting devices for earth-working or material-handling equipment, a much higher pressure level may be necessary.

The present invention has among its objects to provide an improved hydraulic control system of the kind above referred to whereby the operation of the pump in response to variations in pressure in the hydraulic accumulator may be adjusted to vary the pressure in the accumulator and the rate of replenishment thereof according to requirements.

According to the invention, adjustable means responsive to the pressure in the reservoir is provided for regulating the effective output of the pump relative to the pressure in the accumulator in such manner that the operating pressure in the accumulator may be varied according to requirements.

The means responsive to pressure in the accumulator for controlling the operation of the pump may be manually adjustable to regulate the normal pressure level maintained in the accumulator.

Furthermore, the means responsive to pressure in the accumulator for controlling the operation of the pump may be adjustable in response to movement of a control member of a power transmitting device operated by pressure fluid from the accumulator so that the effective output of the pump is regulated to adjust the operating pressure in the accumulator according to requirements.

It is desirable also that the rate at which loss of pressure fluid from the accumulator is made up by the operation of the pump, should be variable, and for this purpose a variable delivery rate pump, e.g. constructed according to the co-pending application Serial No. 18,689 is advantageously employed.

This invention therefore includes a hydraulic control system comprising a hydraulic accumulator, a variable delivery rate pump having its pressure outlet in communication with an inlet of the hydraulic accumulator, a pump control member operating to vary the rate of delivery of the pump from zero up to a predetermined maximum, and means acting on said control member in response to increase of pressure in the accumulator to move the control member against the opposing force of resilient means towards zero delivery rate position. In such an arrangement, the operating pressure in the accumulator is determined by the resistance imposed by the resilient means to movement of the control member of the pump to the zero rate delivery position. On withdrawal of pressure fluid from the accumulator for operation of a power transmitting device, there is a corresponding reduction in pressure in the accumulator and the pressure-responsive means acting on the control member of the pump is no longer able to hold the control member in the zero rate delivery position against the opposing force of the resilient means which latter, thereupon, acts to move the control member to put the pump to delivery. If the withdrawal of pressure fluid from the accumulator is in small increments, as is the case when a power lift for an implement is operating with automatic draft control, the control member of the pump will be moved to put the pump to low delivery rate sufficient to make up the relatively small loss of pressure fluid from the accumulator. If, however, a power transmitting device is operated to withdraw a substantial quantity of pressure fluid from the accumulator, the reduction in pressure in the accumulator will be much greater before the pump comes into operation to make up the loss, and consequently the control member of the pump will be moved further by the resilient means to put the pump to a higher rate of delivery. The resilient means is preferably manually adjustable so that the pressure in the accumulator corresponding to zero delivery of the pump may be varied as required for a particular power transmitting device or devices to be operated. Furthermore, the resilient means may be adjustable in response to movement of a control member of a power transmitting device in such manner that when the power transmitting device is conditioned for maximum output, the rate of delivery of the pump in response to fall in pressure in the accumulator is correspondingly increased. Thus, in the application of the improved control system to a power lift for an implement carried by a conventional three-point linkage on a tractor, the resilient means may be adjustable, e.g. by link and lever mechanism connected to a control lever of the hydraulic power lift, in such manner that when the power lift is operating under working conditions with automatic draft control, loss of pressure from the accumulator in small increments is made up by putting the pump intermittently to a low delivery rate, while, when the control member of the power lift is moved for raising the implement to transport position, the pressure exerted by the resilient means on the control member of the pump is increased so that the pump is put to increased delivery rate to make up the more rapid loss of pressure fluid from the accumulator.

If one or more auxiliary power transmitting devices is or are to be utilized in conjunction with a power lift for an implement, or if power transmitting devices, such as used in connection with earth-working or material-handling equipment, are to be utilized, the resilient means can be readily pre-set to give a suitably increased pressure in the accumulator and response of the pump at a suitably increased delivery rate.

A primary advantage of using a variable delivery rate pump in conjunction with a hydraulic accumulator is that the delivery rate of the pump is varied according to the requirements of the accumulator, thereby giving high sensitivity of response of the power transmitting device or devices under all conditions without harsh operation. Provided that the accumulator is large enough, a pump having a relatively small maximum delivery rate may be used to operate a number of power transmitting devices if the time between operations is sufficient to allow the accumulator to be kept charged up to a suitable pressure.

The invention is hereinafter described, by way of example, with reference to the diagrammatic drawing accompanying the specification, which illustrates the application of the improved hydraulic control system to a tractor having a power lift for an implement operating with automatic draft and/or position control, with connections, if desired, for auxiliary power transmitting devices.

As shown in the drawing, a power transmitting device, such as a hydraulic ram 1 operating lift levers 2 on a cross-shaft 3 of a tractor, is controlled by means of a valve 4 which, in the neutral position shown, shuts off communication between a conduit 5 connected to the ram cylinder, pressure fluid supply line 6 and a pressure fluid return line 7 leading to a sump 8. The pressure fluid supply line 6 communicates with a space 9 in a hydraulic accumulator 10 which may be of any suitable type. For example, a space 11 in the accumulator 10 above the hydraulic pressure fluid therein may be charged with an inert gas, such as nitrogen, which will be compressed as pressure rises in the space 9. Alternatively, the accumulator 10 may be provided with a piston 12 which, as fluid is pumped into the accumulator, rises to compress the gas in the space 11, or a spring 13.

A variable delivery rate pump 14, which may be constructed according to the above identified co-pending application, is continuously driven in any suitable manner from the tractor engine and hydraulic fluid under pressure is delivered from the pump through a non-return valve 15 and conduit 16 to the space 9 of the accumulator 10. The delivery rate of the pump 14 is controlled in accordance with the pressure in the accumulator in the following manner: a plunger 17, or equivalent pressure-responsive member, acts on a control member 18 of the pump against resilient means comprising a piston or like member 19 and compression spring 20 reacting against a stop member 21. The pressure-responsive member 17 is accessible to the pressure in the accumulator 10 through a conduit 22. When the pump 14 delivers fluid under pressure to the accumulator 10, pressure in the accumulator rises until the increase of pressure acting on the member 17 overcomes the resistance of the spring 20 and moves the control member 18 anti-clockwise to put the pump 14 to zero delivery. If hydraulic fluid is withdrawn from the accumulator, pressure in the accumulator drops and the spring 20 then acts through the member 19 to move the control member 18 clockwise to put the pump 14 to delivery, the rate of delivery depending on the pressure drop in the accumulator. Thus, if hydraulic fluid under pressure is withdrawn from the accumulator in small increments, the pump will be put to a low delivery rate sufficient to make up the loss of fluid. On the other hand, if considerable withdrawal of hydraulic fluid from the accumulator takes place, the pump will be put to increased delivery rate up to its maximum so as to recharge the accumulator without delay up to the required pressure.

Inasmuch as the hydraulic power transmitting device, such as the hydraulic ram 1, is operated directly from the accumulator 10, the sensitivity of response depends on the level of pressure normally maintained in the accumulator. It is therefore desirable that it should be possible to adjust the normal pressure level in the accumulator 10. For this purpose the stop member 21 may be adjustable as by means of a screw 22′ engaging an extension 23 of the stop member 21. If the screw 22′ is adjusted to increase the compression on the spring 20, the level of pressure in the accumulator 10 will be correspondingly increased.

The improved hydraulic control system described may be used for the operation of hydraulic power transmitting devices of various kinds, e.g. as used in tractor-mounted earth-working or material-handling equipment, power steering, auxiliaries for tractor-mounted or tractor-trailed implements and the like. The system, however, is particularly applicable for use on a tractor in which the power lift is operable under the control of a draft-responsive member 24 movable in response to compressive or tensile stresses in the top link 25 of an implement attaching linkage against the action of a balancing spring 26 or springs in well-known manner. In the arrangement shown, the valve 4 is operated by a single lever control mechanism according to the co-pending application Serial No. 48,961 whereby the power lift may be operated with automatic draft control or, alternatively, with so-called position control. In the particular arrangement diagrammatically illustrated, a main bell-crank lever having arms 27 and 28 is pivoted at 29 to one arm 30 of a control lever 31. The arm 27 is disposed substantially vertically and at its lower end is connected at 32 to a link 33 operating the valve 4. The arm 27 also is positioned to coact with the draft-responsive member 24 for operation of the valve 4 to control the hydraulic lift of the implement in accordance with variations in draft, i.e. with automatic draft control in well-known manner. The arm 28 is provided with a roller 34 coacting with a cam 35 on the cross-shaft 3 for operating the valve 4 with position control of the implement also in well-known manner. Changeover from automatic draft control to position control, and vice versa, is effected by movement of the control lever 31, as described in the co-pending application Serial No. 48,961, now Patent No. 2,083,777.

When operating with automatic draft control, sensitive response is required, but harshness of operation and possible over-correction are undesirable. It may be necessary, therefore, to adjust the pressure level in the accumulator 10 so that the pressure normally available is adjusted sufficiently to lift the implement with the required degree of rapidity for the automatic draft control arrangement to function effectively. However, it is also desirable that it should be possible to lift the implement rapidly to an upper transport position when required. For lifting the implement, the control lever 31 is moved anti-clockwise to an extreme position and, in order to give a temporary increase in the accumulator pressure and rapid replenishment of fluid in the accumulator to give a quick lift, means actuated by the control lever 31 is provided for temporarily increasing the compression on the spring 20. For example, as shown, a lever 45 pivoted at 36 has a forked lower end 37 engaging the stop member 21, while an upper arm 38 of the lever is connected by means of a link 39 to an arm 40 of the control lever 31 which is pivoted at 41. It will be seen that when the control lever 31 is moved clockwise to lower the implement to working position, the additional compression of the spring 20 will be released and the pressure in the accumulator 10 will be restored to the predetermined normal. Any number of additional connections, e.g. 42, 43, 44, may be provided for the operation of auxiliary power transmitting devices.

An important advantage of the improved hydraulic control system according to the invention is that, in addition to a hydraulic lift or other main power transmitting device, any number of auxiliaries may be utilized if a hydraulic accumulator of appropriate capacity is provided and, furthermore, any desired degree of sensitivity of operation can be achieved.

It will be understood that the invention is not limited to the particular embodiment hereinbefore described with reference to the drawing. For example, adjustment of the pressure level maintained in a hydraulic accumulator may be attained using a pump of conventional form, in which case the pressure-responsive member 17 and the spring 20, adjustable by means such as described, would be arranged to cooperate with a valve member controlling a suction inlet of the pump or a pressure-responsive low pressure by-pass arrangement on the output side of the pump. The pressure-responsive member 17 may be accessible to pressure in the gas space of the accumulator or may be operated mechanically by movement of a piston in the accumulator. Furthermore, the improved hydraulic control system may be used in conjunction with any other power lift arrangement adapted for the operation of an implement with automatic draft control, with or without alternative position control.

What is claimed is:

1. For use in connection with an earth working machine and an associated implement; a power system adapted to be mounted on said machine and comprising a fluid motor adapted to be operatively connected with said implement; a fluid reservoir; an accumulator; pump means including means for varying the delivery thereof and having a fluid inlet communicating with said reservoir and a fluid outlet communicating with said accumulator; flow control means associated with said motor, reservoir, and accumulator for selectively communicating said accumulator with said motor and said motor with said reservoir; means for actuating said flow control means; means controlled by said accumulator for operating said varying means; means biasing said varying means in opposition to said operating means; and means responsive to actuation of said flow control means by said actuating means for modulating said opposition of said biasing means.

2. For use in connection with an earth working machine and an associated implement; a power system adapted to be mounted on said machine and comprising a fluid motor adapted to be operatively connected with said implement; a fluid reservoir; an accumulator; a variable displacement pump including means for varying the displacement thereof and having a fluid inlet communicating directly with said reservoir and a fluid outlet communicating with said accumulator; flow control means associated with said motor, reservoir, and accumulator for selectively communicating said accumulator with said motor and said motor with said reservoir; means for actuating said flow control means; means controlled by said accumulator for operating said varying means; means biasing said varying means in opposition to said operating means; and means responsive to actuation of said flow control means by said actuating means for modulating said opposition of said biasing means.

3. For use in connection with an agricultural machine and an associated implement; a power system adapted to be mounted on said machine and comprising a fluid motor adapted to be operatively connected with said implement; a fluid reservoir; an accumulator; a variable displacement pump including means for varying the displacement thereof and having a fluid inlet communicating directly with said reservoir and a fluid outlet communicating with said accumulator; flow control means associated with said motor, reservoir, and accumulator for selectively communicating said accumulator with said motor in order to supply fluid to said motor and said motor with said reservoir in order to exhaust fluid from said motor; means for actuating said flow control means; means controlled by said accumulator for operating said varying means; means biasing said varying means in opposition to said operating means; and means controlled by said actuating means for increasing said opposition of said biasing means upon actuation of said flow control means to communicate said accumulator with said motor.

4. For use in connection with an agricultural machine and an associated implement; a power system adapted to be mounted on said machine and comprising a fluid motor adapted to be operatively connected with said implement; a fluid reservoir; an accumulator; a variable displacement pump including means for varying the displacement thereof and having a fluid inlet communicating directly with said reservoir and a fluid outlet communicating with said accumulator; flow control means associated with said motor, reservoir, and accumulator for selectively communicating said accumulator with said motor in order to supply fluid to said motor and said motor with said reservoir in order to exhaust fluid from said motor; manual means for actuating said flow control means; means controlled by said accumulator for operating said varying means; means biasing said varying means in opposition to said operating means; and means controlled by said manual means for temporarily increasing said opposition of said biasing means upon actuation of said flow control means to communicate said accumulator with said motor.

5. For use in connection with an agricultural machine and an associated implement; a power system adapted to be mounted on said machine and comprising a fluid motor adapted to be operatively connected with said implement; a fluid reservoir; an accumulator; a variable displacement pump including means for varying the displacement thereof and having a fluid inlet communicating directly with said reservoir and a fluid outlet communicating with said accumulator; flow control means associated with said motor, reservoir, and accumulator for selectively communicating said accumulator with said motor in order to supply fluid to said motor and said motor with said reservoir in order to exhaust fluid from said motor; manual means for actuating said flow control means; pressure responsive means controlled by said accumulator for operating said varying means; means biasing said varying means in opposition to said pressure responsive means; and means controlled by said manual means for increasing said opposition of said biasing means upon actuation of said flow control means to communicate said accumulator with said motor.

6. For use in connection with an agricultural machine and an associated implement; a power system adapted to be mounted on said machine and comprising a fluid motor adapted to be operatively connected with said implement; a fluid reservoir; an accumulator; a variable displacement pump including means for varying the displacement thereof and having a fluid inlet communicating directly with said reservoir and a fluid outlet communicating with said accumulator; flow control means associated with said motor, reservoir, and accumulator and being selectively movable between a first position communicating said accumulator with said motor in order to supply fluid to said motor and a second position communicating said motor with said reservoir in order to exhaust fluid from said motor; pressure responsive means communicating with said accumulator and said varying means for operating said varying means to decrease said pump displacement in accordance with increasing pressure in said accumulator; means biasing said varying means in opposition to said pressure responsive means; and means responsive to movement of said flow control means to said first position for increasing said opposition of said biasing means.

7. For use in connection with an agricultural machine and an associated implement; a power system adapted to be mounted on said machine and comprising a fluid motor adapted to be operatively connected with said implement; a fluid reservoir; an accumulator; a variable displacement pump including means for varying the displacement thereof and having a fluid inlet communicating directly with said reservoir and a fluid outlet communicating with said accumulator; flow control means associated with said motor, reservoir, and accumulator for selectively communicating said accumulator with said motor in order to supply fluid to said motor and said motor with said reservoir in order to exhaust fluid from said motor; manual means for actuating said flow control means; pressure responsive means communicating with said accumulator and said varying means for operating said varying means to decrease said pump displacement in accordance with increasing pressure in said accumulator; spring means biasing said varying means in opposition to said pressure responsive means; and means controlled by said manual means for increasing the biasing force of said spring means upon actuation of said flow control means to communicate said accumulator with said motor.

8. For use in connection with an agricultural machine and an associated implement; a power system adapted to be mounted on said machine and comprising a fluid motor adapted to be operatively connected with said implement; a fluid reservoir; an accumulator; a variable displacement pump having means including a movable control arm for varying the displacement thereof and having a fluid inlet communicating directly with said reservoir and a fluid outlet communicating with said accumulator; flow control means associated with said motor, reservoir, and accumulator for selectively communicating said accumulator with said motor in order to supply fluid to said motor and said motor with said reservoir in order to exhaust fluid from said motor; means for actuating said flow control means; housing means defining a bore adjacent said control arm; means communicating said bore with said accumulator; a plunger slidable in said bore and engageable with said control arm to move same so as to decrease said pump displacement in accordance with increasing pressure in said accumulator; a spring biasing said control arm to move same so as to increase said pump displacement; and linkage means connected with said actuating means and said spring for modulating the biasing force of said spring upon actuation of said flow control means.

9. For use in connection with an agricultural machine and an associated implement; a power system adapted to be mounted on said machine and comprising a fluid motor adapted to be operatively connected with said implement; a fluid reservoir; an accumulator; a variable displacement pump having means including a movable control arm for varying the displacement thereof and having a fluid inlet communicating directly with said reservoir and a fluid outlet communicating with said accumulator; flow control means associated with said motor, reservoir, and accumulator for selectively communicating said accumulator with said motor in order to supply fluid to said motor and said motor with said reservoir in order to exhaust fluid from said motor; manual means for actuating said flow control means; housing means defining a bore adjacent said control arm; means communicating said bore with said accumulator; a plunger slidable in said bore and engageable with said control arm to move same so as to decrease said pump displacement in accordance with increasing pressure in said accumulator; a spring biasing said control arm to move same so at to increase said pump displacement; and linkage means connected with said manual means and said spring for increasing the biasing force of said spring upon actuation of said flow control means to communicate said accumulator with said motor.

10. For use in connection with an agricultural machine and an associated implement; a power system adapted to be mounted on said machine and comprising a fluid motor adapted to be operatively connected with said implement; a fluid reservoir; an accumulator, a variable displacement pump having means including a control arm for varying the displacement thereof and having a fluid inlet communicating directly with said reservoir and a fluid outlet communicating with said accumulator; flow control means associated with said motor, reservoir, and accumulator for selectively communicating said accumulator with said motor in order to supply fluid to said motor and said motor with said reservoir in order to exhaust fluid from said motor; manual means for actuating said flow control means; housing means defining a pair of coaxial bores on opposite sides of said control arm, each bore having a plunger slidable therein adapted to move said control arm in order to very said pump displacement; means communicating one of said bores with said accumulator whereby to move said plunger in said one bore, thereby moving said control arm so as to decrease said pump displacement in accordance with increasing pressure in said accumulator; a spring in the other of said bores biasing said plunger therein, thereby moving said control arm so as to increase said pump displacement; and linkage means connected with said manual means and said spring for increasing the biasing force of said spring upon actuation of said flow control means to communicate said accumulator with said motor.

11. The invention according to claim 10 further comprising check valve means in said fluid outlet for preventing return flow from said accumulator to said pump.

12. In combination, a tractor, an implement, a power system mounted on said tractor and comprising a fluid motor operatively connected with said implement; a fluid reservoir; an accumulator; pump means including means for varying the delivery thereof and having a fluid inlet communicating with said reservoir and a fluid outlet communicating with said accumulator; flow control means associated with said motor, reservoir, and accumulator for selectively communicating said accumulator with said motor in order to supply fluid to said motor thereby raising said implement and said motor with said reservoir in order to exhaust fluid from said motor thereby lowering said implement; means for actuating said flow control means; pressure responsive means communicating with said accumulator and said varying means for operating said varying means to decrease said pump delivery in accordance with increasing pressure in said accumulator; means biasing said varying means to increase said pump delivery; and means controlled by said actuating means for increasing the force of said biasing means upon actuation of said flow control means to communicate said accumulator with said motor.

References Cited in the file of this patent

UNITED STATES PATENTS

| | | |
|---|---|---|
| 2,552,604 | Thoma | May 15, 1951 |
| 2,714,346 | Valin | Aug. 2, 1955 |
| 2,750,862 | Garmager | June 19, 1956 |
| 2,888,805 | Czarnocki | June 2, 1959 |
| 2,965,181 | Senkowski | Dec. 20, 1960 |

FOREIGN PATENTS

| | | |
|---|---|---|
| 632,214 | Great Britain | Nov. 18, 1949 |